United States Patent
Wishart

(10) Patent No.: US 9,684,071 B2
(45) Date of Patent: Jun. 20, 2017

(54) SAR DATA PROCESSING

(75) Inventor: Alexander Walker Wishart, Stevenage (GB)

(73) Assignee: ASTRIUM LIMITED, Hertfordshire (GB)

( * ) Notice: Subject to any disclaimer, the term of this patent is extended or adjusted under 35 U.S.C. 154(b) by 182 days.

(21) Appl. No.: 14/004,002

(22) PCT Filed: Mar. 9, 2012

(86) PCT No.: PCT/EP2012/054164
§ 371 (c)(1),
(2), (4) Date: Sep. 23, 2013

(87) PCT Pub. No.: WO2012/120137
PCT Pub. Date: Sep. 13, 2012

(65) Prior Publication Data
US 2014/0009326 A1     Jan. 9, 2014

(30) Foreign Application Priority Data
Mar. 10, 2011    (EP) .................................... 11275041

(51) Int. Cl.
*G01S 13/90*    (2006.01)
(52) U.S. Cl.
CPC .......... *G01S 13/9011* (2013.01); *G01S 13/90* (2013.01)
(58) Field of Classification Search
CPC ...... G01S 13/90; G01S 13/9011; G01S 13/06; G01S 13/89
See application file for complete search history.

(56) References Cited

U.S. PATENT DOCUMENTS

| 4,910,520 A | * | 3/1990 | Rosen ..................... G01S 13/90 |
| | | | 342/25 A |
| 5,191,344 A | | 3/1993 | Moreira |

(Continued)

FOREIGN PATENT DOCUMENTS

| EP | 0 695 054 A2 | 1/1996 |
| JP | H06-82386 B2 | 10/1994 |
| JP | 2005024395 A | 1/2005 |

OTHER PUBLICATIONS

International Search Report (PCT/ISA/210) mailed on Jun. 8, 2012, by the European Patent Office as the International Searching Authority for International Application No. PCT/EP2012/054164.
(Continued)

*Primary Examiner* — Timothy A Brainard
(74) *Attorney, Agent, or Firm* — Buchanan Ingersoll & Rooney PC

(57) ABSTRACT

An apparatus is disclosed for a spaceborne or aerial platform having a frequency demultiplexer for frequency demultiplexing a signal corresponding to a range line or an azimuth line of SAR data, and including information about a plurality of target points, into a plurality of frequency channels, and a compression device for performing compression on each frequency channel, each frequency channel signal having information about the same target points. The frequency demultiplexer and the compression device can be implemented in hardware. The apparatus may be used for either or both of the range compression and the azimuth compression of a SAR arrangement on board a spaceborne or aerial platform and the SAR arrangement may generate a plurality of sub-images corresponding to the frequency channels from the SAR raw data. The sub-images may be combined by averaging in order to reduce the volume of memory required to store the SAR data.

19 Claims, 4 Drawing Sheets

(56) References Cited

U.S. PATENT DOCUMENTS 5,646,623 A 7/1997 Walters et al.
5,699,363 A 12/1997 Wishart et al.

OTHER PUBLICATIONS

Written Opinion (PCT/ISA/237) mailed on Jun. 8, 2012, by the European Patent Office as the International Searching Authority for International Application No. PCT/EP2012/054164.
Search Report mailed on Jul. 25, 2011, by the European Patent Office for Application No. 11275041.9.
Rouse et al., "Swathbuckler Wide Area SAR Processing Front End", IEEE, Apr. 2006, pp. 673-678.
Pryde, "Design of a real-time high quality SAR processor", Proceedings of SPIE, Jan. 1994, pp. 148-159, vol. 2230.
Cafforio et al., "Synthetic Aperture Radar Focusing with Polyphase Filters", Signal Processing, Dec. 1989, pp. 397-411, vol. 18, No. 4.
Notification Concerning Transmittal of International Preliminary Report on Patentability (Chapter I of the Patent Cooperation)(Form PCT/IB/326 & Form PCT/IB/373) and the Written Opinion of the International Searching Authority (Translation)(Form PCT/ISA/237) issued on Sep. 19, 2013, in the corresponding International Application No. PCT/EP2012/054164. (8 pages).
Crochiere et al., "Multirate Digital Signal Processing: Section 2.3 Sampling Rate Conversion—A Direct Digital Approach" (1983 by Prentice-Hall, Inc., Englewood Cliffs, New Jersey 07632), pp. 35-39.
Crochiere et al., "Multirate Digital Signal Processing: Section 7.4 Effects of Multiplicative Modifications in the DFT Filter Bank" (1983 by Prentice-Hall, Inc., Englewood Cliffs, New Jersey 07632), pp. 349-356.
Office Action issued in corresponding Japanese Patent Application No. 2013-557122 dated Jun. 21, 2016 with English translation.

* cited by examiner

SAR DATA PROCESSING

FIELD OF THE INVENTION

The invention relates to processing of synthetic aperture radar (SAR) data.

BACKGROUND OF THE INVENTION

Synthetic aperture radar can be used to generate high resolution images of a target. The target is illuminated by pulses of radiation and the echoes of the pulses are detected and processed to form image data. SAR can be used on a spacecraft, such as a satellite. The raw echo data in digital form is typically referred to as a Level 0 product. SAR images formed from the Level 0 products are typically referred to as a Level 1 product.

Typically, the Level 0 raw data obtained by SAR on satellites is processed on ground into a Level 1 product and the satellites therefore have to store the Level 0 data until it can be transmitted to ground. This can be a problem when the satellite does not frequently have the opportunity to communicate with a ground station. For example, on planetary missions, the satellites would have to store received data for an extended time. Moreover, satellites such as low Earth orbit (LEO) satellites would have to store data when they are not in communication with a ground station. The number of images that can be obtained is then limited by the available storage on the satellite.

It is sometimes desired to have more than one SAR antenna on a satellite in order to, for example, generate interferometric images or complex coherence functions. By increasing the number of SAR antennas, the amount of Level 0 raw data generated is also increased, exacerbating the problem.

It has been proposed that there may be advantages to carrying out image processing on the satellite. For example, if lower resolution images are acceptable, the level 0 data could be processed into lower resolution images on the satellite and thereby allow the satellites to store data for a larger number of images than if the stored data was Level 0 data. Moreover, in some applications it is desired to provide real-time or near real-time monitoring of a target scene and it may take too long time to send the image data to ground for processing.

State of the art SAR image processing is implemented in software on ground. Currently available CPUs suitable for space on-board processing would be too slow to run the computationally intensive software used on ground effectively. This is because the processing rate of fault tolerant general purpose CPUs suitable for space on-board processing is orders of magnitude less than terrestrial systems.

The invention aims to address the above and other problems.

SUMMARY OF THE INVENTION

According to the invention, there is provided an apparatus for a spaceborne or aerial platform, comprising a frequency demultiplexer for frequency demultiplexing a signal corresponding to a range line or an azimuth line of SAR data and comprising information about a plurality of target points into a plurality of frequency channels, each frequency channel signal comprising information about the plurality of target points, and compression means for performing image formation on each frequency channel.

Since the data is frequency demultiplexed into a number of channels, the bandwidth of the channels for which compression is carried out is narrower and the compression can be carried out in hardware. Both the frequency demultiplexer and the compression means can be implemented in hardware.

For this and other reasons, the invention makes it possible for the range compression and azimuth compression to be carried out on a spaceborne or aerial platform. For example, the invention makes it possible for the range and azimuth compression to be carried out on a satellite or other spacecraft. The invention also makes it possible for the range or azimuth compression to be carried out an aerial vehicle, for example, an unmanned aerial vehicle (UAV).

The invention combines multi-rate digital signal processing techniques in a novel way to minimise the implementation complexity of the SAR image generation.

The compression means may comprise one or more compression filters.

The output of the frequency demultiplexer may be provided to the inputs of a plurality of compression filters. The frequency demultiplexer isolates the frequency channels and each frequency channel may be provided to a respective compression filter.

Alternatively, the one or more compression filters may comprise a compression filter that provides an output signal to the frequency demultiplexer, the compression filter $h'(n)$ providing a filtering function with an imaged response for each frequency channel. The frequency response of the compression filter providing the imaged response may be $H'(e^{j\omega})=H(e^{j\omega K})$, where $H(e^{j\omega})$ is the frequency response of a prototype filter $h(n)$ and $$h'(n) = \begin{cases} h(n/K), & n = 0, \pm K, \pm 2K \ldots \\ 0, & \text{otherwise} \end{cases}$$

and where K is the number of frequency channels.

The frequency demultiplexer then isolates the frequency channels in compressed form.

By rearranging the order of the frequency demultiplexing and the compression and carrying out the compression function before the demultiplexing function, the apparatus can be even more computationally efficient.

The frequency demultiplexer may comprise a block channeliser. The block channeliser may comprises block fine processing stages and block coarse processing stage, the block fine processing stages being configured to generate from the signal corresponding to a range line or an azimuth line one or more first frequency division multiplex FDM signals with a number of even index channels and one or more second FDM signals with a number of odd index channels, the region of the spectrum corresponding to the odd index channels having been nulled out in the one or more first FDM signals and the region of the spectrum corresponding to the even index channels having been nulled out in the one or more second FDM signals. The one or more first FDM signals and second FDM signals may be provided to separate coarse processing stages and each coarse processing stage may generate a plurality of narrow band channels from its respective FDM signal. Each block coarse processing stage may perform a filtering function with a response the transition bands of which lie in the nulled out regions of the spectrum of the associated FDM signal.

According to the invention, there is also provided an arrangement for creating a SAR image on a spaceborne or aerial platform, comprising: analogue to digital converter means for converting received SAR echoes into digital samples; a processor comprising range processing means for carrying out range compression of arrays of samples corresponding to range lines and azimuth processing means for carrying out azimuth compression on arrays of samples corresponding to azimuth lines, wherein at least one out of the range compression means and the azimuth compression means comprises the apparatus defined above, the processor being configured to generate a plurality of sub-images corresponding to the frequency channels into which a signal corresponding to a range line or an azimuth line is demultiplexed; and image generator means for combining the sub-images.

Both the range processing means and the azimuth processing means may comprise said apparatus having a frequency demultiplexer and compression means, wherein the frequency demultiplexer in the range processing means is configured to demultiplex a signal corresponding to a range line into $K_{range}$ frequency channels and the frequency demultiplexer of the azimuth processing means is configured to demultiplex a signal corresponding to an azimuth line into $K_{azimuth}$ frequency channels such that the processor generates $K_{range} K_{azimuth}$ sub-images.

The image generator means may be configured to average the sub-images to provide a SAR image. The volume of memory required to store a multi-looked, averaged image generated from the raw data would typically be significantly smaller than the volume of memory required to store the raw high resolution data. By averaging the sub-images, significantly smaller memory is required to store the data to be transmitted to ground and data for a larger number of images can be stored in between transmissions to the ground. Additionally, by carrying out image generation on the satellite, real-time, or at least quicker, analysis of the imaged target can be carried out. The target may be monitored and alerts may be raised in response to changes to the images generated on the satellite.

The receiver may be configured to receive echoes from two or more SAR antennas and the image generator means may be configured to generate an interferogram or a complex coherence map from the sub-images.

According to the invention, there is also provided a satellite comprising the above defined apparatus or arrangement. The satellite may also comprise means for transmitting the processed SAR data in a downlink.

According to the invention, there is also provided a method of generating a SAR image on an spaceborne or aerial platform, comprising receiving echoes of a chirp transmitted from a SAR antenna; digitising the echoes into digital samples; carrying out range compression on arrays of samples corresponding to range lines; and carrying our azimuth compression on arrays of samples corresponding to azimuth lines, wherein at least one out of carrying out range compression and carrying out azimuth compression comprises frequency demultiplexing signals corresponding to the arrays into a plurality of channels, each signal corresponding to an array comprising information about a plurality of target points and each frequency channel comprising information about said plurality of target points, and carrying out image formation on each channel such that the range compression and the azimuth compression generates a plurality of sub-images corresponding to a plurality of frequency channels and wherein the method further comprises combining said sub-images.

The frequency demultiplexing and the image formation may be carried out in hardware.

The signal may be frequency demultiplexed before image formation is carried out on each frequency channel.

Alternatively, the image formation on the channels may be carried out before the channels are isolated and the frequency demultiplexing may comprise frequency demultiplexing the signal comprising the frequency channels in compressed form.

The range compression may comprise frequency demultiplexing the range lines into a plurality of channels and range compressing the channels individually using a compression filter to form a plurality of intermediate matrices and the azimuth compression may comprise frequency demultiplexing each azimuth line of each intermediate matrix into a plurality of frequency channels and azimuth compressing each frequency channel individually using a compression filter to form the plurality of sub-images.

Alternatively, the range compression may comprise frequency demultiplexing the range lines into a plurality of channels and range compressing the channels individually using a compression filter to form a plurality of intermediate matrices and the azimuth compression may comprise averaging the samples of each azimuth line or other unfocussed SAR processing to form the plurality of sub-images.

Combining said images may comprise averaging the sub-images to produce a compressed image.

Receiving echoes from an antenna may comprise receiving echoes from a first antenna and combining the sub-images comprises correlating corresponding sub-image from the first and the second antenna to form a number of sub-interferograms and averaging the sub-interferograms to generate a compressed interferogram.

BRIEF DESCRIPTION OF THE DRAWINGS

Embodiments of the invention will now be described, by way of example, with reference to the accompanying drawings, in which.

DETAILED DESCRIPTION

Figure 1:
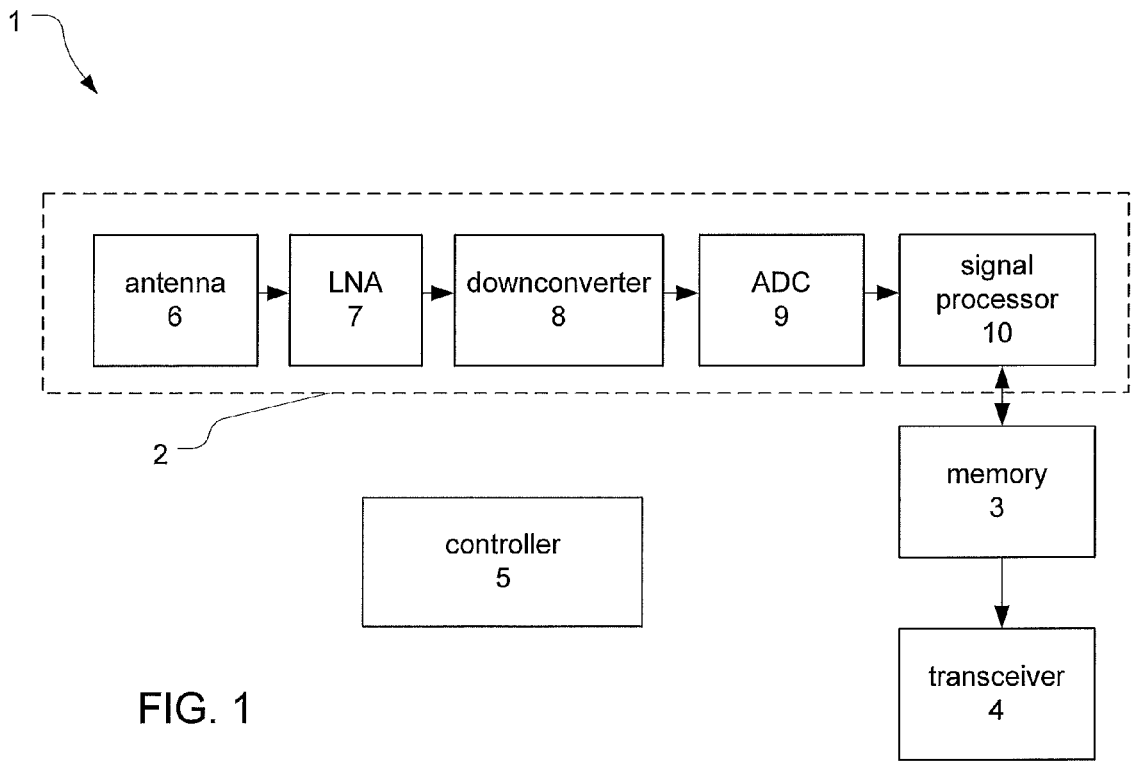
FIG. 1 is a schematic diagram of a spacecraft payload comprising a SAR antenna arrangement.

With reference to FIG. 1, there is provided a satellite payload 1 comprising synthetic aperture radar (SAR) antenna arrangement 2, a memory 3 and a transceiver 4 for receiving commands and transmitting data to a control station (not shown) on the ground. The satellite payload also comprises a controller 5 for controlling the SAR antenna arrangement 2, the memory 3 and the transceiver 4. The controller 5 may further receive commands from the control station on ground. The SAR arrangement 2 can be used for both transmitting radar pulses and receiving echoes. FIG. 1 shows the components in the receive chain. As shown in FIG. 1, the SAR arrangement comprises an antenna 6, a low noise amplifier (LNA) 7, a downconverter 8 for downconverting the received SAR echoes to baseband frequency, an analogue to digital converter (ADC) 9 and a digital signal processor 10.

If the antenna 6 is also used to transmit the radar pulses, arrangement 2 would also comprise a transmit chain with a digital to analogue converter, an upconverter and a power amplifier. It should be realised, that for sufficiently fast ADC and DAC converters, the downconverter 8 and the upconverters may not be used.

According to some embodiments, the satellite payload 1 may include more than one SAR antenna, in which case there would be a separate receive chain with a separate low noise amplifier, downconverter and ADC for each antenna. If the antennas are also used to transmit radar pulses, there would also be a separate transmit chain for each antenna.

The antenna illuminates a wide area with a pulsed beam. Each pulse may have a frequency that varies with time. The instantaneous RF frequency of a pulse or "chirp" at time t is $f_c+K_{chirp}t$, where $f_c$ is the centre or carrier frequency and $K_{chirp}$ is the rate of change of the frequency of the pulse or chirp. The maximum instantaneous frequency offset from the carrier is $K_{chirp}T_{chirp}$, where $T_{chirp}$ is the duration of the pulse. The bandwidth of the pulse, $B_{chirp}$, can be considered to be approximately equal to the maximum instantaneous frequency offset:

$$B_{chirp} \approx K_{chirp}T_{chirp} \qquad \text{Equation 1}$$

As an example, each chirp may have a bandwidth, $B_{chirp}$, of approximately 100 MHz.

The satellite travels in the along track or "azimuth" direction and the pulses propagate in the across-track or "range" direction. Each pulse illuminates a target area or a swath and, for each transmitted pulse, the antenna arrangement 2 receives and processes reflections from scatterers within the swath illuminated by the pulse. The echoes received by the antenna 6 are sampled at a frequency related to the bandwidth of the chirps. The samples of the received echoes of a particular pulse forms a 1D array of samples referred to as a "range line". In some embodiments, a typical number of samples in each range line is 20,000. However, it should be realised that the number of samples in a range line can vary greatly with the application.

Each sample in the range line is associated with an index which is proportional to the round-trip distance between the antenna and the target. A range line comprising the sampled echoes for a pulse is generated for each pulse forming a matrix of data having one axis corresponding to the range direction and one axis corresponding to the azimuth direction. A data array formed by the samples that have the same index is referred to as an "azimuth line". In some embodiments, a typical number of samples in an azimuth line is 10,000. However, it should be realised that the number of samples of the azimuth lines can vary depending on the application.

The signal processor 10 processes the echoes of the chirps according to an algorithm known as a "Range-Doppler" algorithm. The Level 0 SAR data is processed in the signal processor 10 into Level 1 image data. The processing involves mapping points in the echo matrix to corresponding points in a SAR image. In more detail, SAR radar uses the fact that the distance between the antenna and a target point changes with the relative movement. The signal energy from a particular point of the target is spread in range and azimuth and the SAR data processing collects this dispersed energy into a single pixel in the output image. In range, the signal from a particular point of the target is spread by the duration of transmitted pulse and, in azimuth, the signal is spread by the duration the target point is illuminated by the antenna beam.

Figure 2:
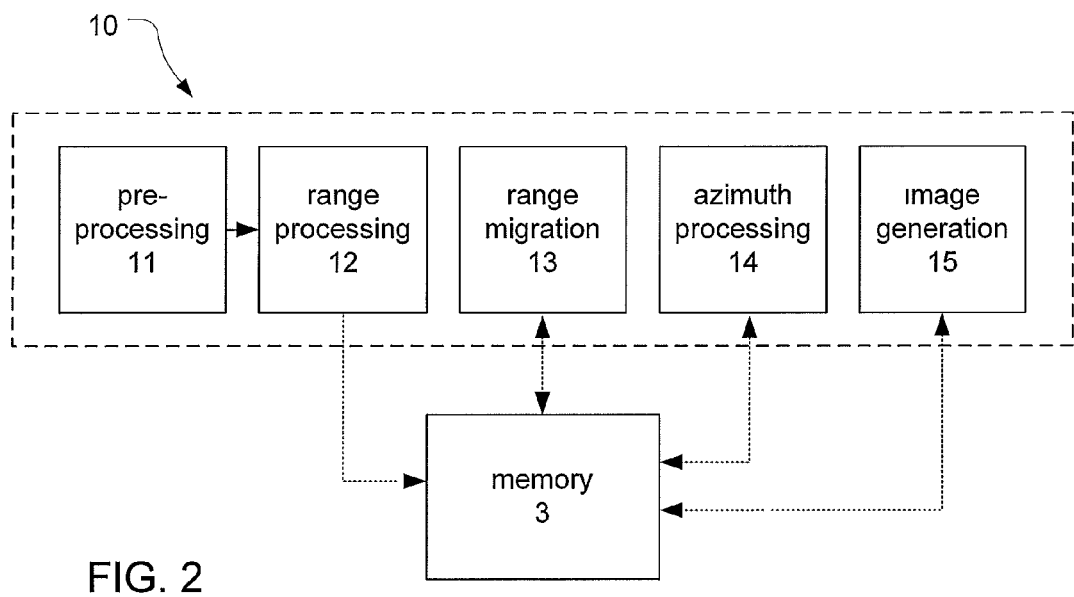
FIG. 2 is a schematic diagram of the components of the digital processor of the SAR antenna arrangement.

With reference to FIG. 2, the signal processor 10 comprises a pre-processor 11 for converting the signal into complex form, a range processor 12 for image processing the data matrix in the range direction, a range migration unit 13 for adjusting the data in the matrix subsequent to the processing in the range direction, an azimuth processor 14 for image processing the data matrix in the azimuth direction and an image generator unit 15 for generating an image.

The image processing of the data includes the comparison of the echo signal with the original transmitted signals. This can be accomplished with a convolution of the echo signals and the transmitted pulses. Ideally, 2D convolutions in which every point or pixel in the echoes matrix is mapped to its corresponding pixel in the SAR image are carried out to create an image. However, this would be very processing intensive and so in practice the range and azimuth compression is typically decoupled into a set of 1D convolutions on the range lines in the range processor 12, building up a new intermediate matrix, and then a set of 1D convolutions on the azimuth lines in the azimuth processor 14 to form a final matrix corresponding to an image.

The range lines are provided to the range processor 12, via the pre-processor 11, as they are digitised. The pre-processor 11 comprises a digital anti-aliasing filter (DAAF). The raw data of each range line is input to the DAAF as a real digital signal and the DAAF operates on the real incoming digital signal to convert it into complex, baseband form, before passing the range line to the range processor 12. The DAAF also decimates the sampling rate by a factor of 2. The sampling frequency of the signal in the range processor 12 and the azimuth processing unit will hereinafter be denoted as $f_s$. Accordingly, the sampling frequency of the input signal to the DAAF would be $2f_s$.

The range processor 12 acts on each range line to range compress the raw data. It carries out the 1D convolutions on each range line and builds up one or more intermediate matrices in memory 3, as will be described in more detail below.

The range compressed output is often skewed and once all the range rows in the intermediate matrices are filled in, the range migration unit 13 retrieves the intermediate matrices in the memory and aligns the samples into the correct columns for the azimuth processing. The range migration function can be implemented with a suitable algorithm that acts on the samples in memory, as would be realised by the skilled person in the art. The azimuth processor 14 then retrieves the adjusted one or more intermediate matrices from the memory 3, carries out 1D convolutions on the azimuth lines as will be described in more detail below and stores the final matrices in the memory 3. The image generator unit 15 may carry out further processing on the final matrices as will also be described in more detail below.

Convolutions can be carried out using different techniques. For example, direct convolution can be used. Moreover, fast convolution with Fast Fourier Transform (FFT)

techniques, or the functionally equivalent so-called SPE-CAN (Spectral Analysis) method can also be used.

According to embodiments of the invention, some or all components of the digital processor are implemented in hardware. The skilled person would realise that the DAAF and the range migration function can easily be implemented in hardware. As will be realised by the skilled person, the DAAF is a high speed, very simple function which is ideally suited to hardware. The range migration algorithm can be implemented in either hardware or software depending on the application. According to the invention, one or both of the range processing unit 12 and the azimuth processor unit 14 is implemented using hardware, as will be described in more detail with respect to FIG. 5. Additionally, in some embodiments, the image generator unit 15 is also implemented using hardware. In other embodiments, the image generator unit 15 may be a software function. The controller 5 may be a small general purpose CPU with a control function implemented in software and one or more of the components of the digital processor, but not all, may be provided as part of the software control function.

Figure 3:
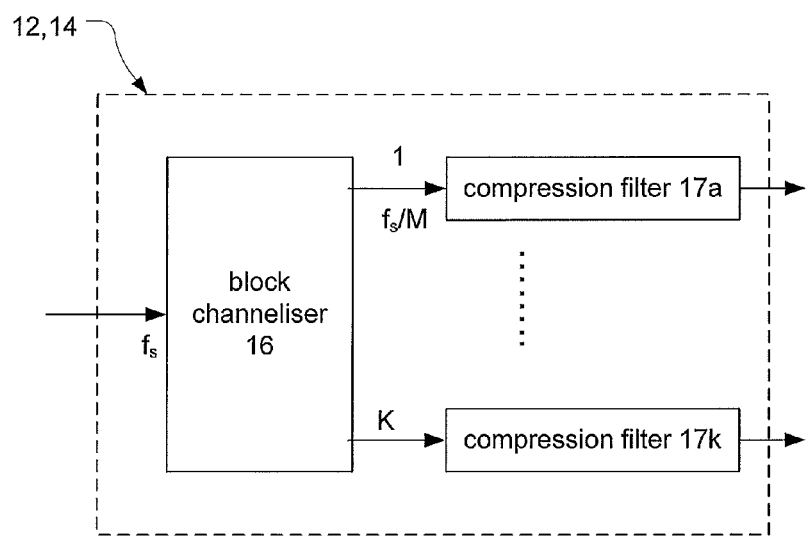
FIG. 3 is a schematic diagram of a processor unit of the digital processor shown in FIG. 2.

With reference to FIG. 3, the components of a range processor unit 12 or an azimuth processor unit 14 is shown. The range processor unit 12 and the azimuth processor unit 14 have corresponding components but components are configured differently depending on whether they operate on range or azimuth lines. In the description of FIG. 3 hereinafter we will refer to the processor unit as a range processor unit and describe it with reference to how it acts on a range line. However, it should be realised that corresponding processing steps could be carried out for each azimuth line in the azimuth processing unit but with a different convolution function.

According to embodiments of the invention, the processor unit 12, 14 provides more efficient processing by frequency demultiplexing the data into a number K of sub-bands and creating a sub-image for each sub-band before combining the sub-images. The sub-bands will also be referred to as "frequency channels" herein. Each frequency channel, demultiplexed from the full bandwidth signal, contains information about all the scatterers in the target area but to a lower resolution than the full bandwidth signal.

With reference to FIG. 3, the range processor arrangement is implemented in hardware and comprises a block processor 16 which provides the frequency channelisation and a decimation function and a number of range compression filters 17a, 17k. By separating the wide bandwidth into smaller channels, a direct convolution filter can be used for each sub-channel which is readily implemented in hardware.

Figure 4:
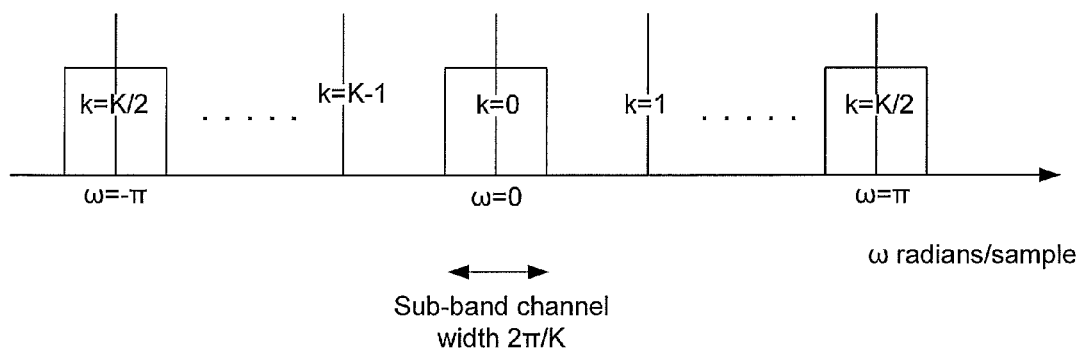
FIG. 4 is a schematic diagram of the sub-channel stacking arrangement of a signal to be processed in the processor unit of FIG. 3.
Figure 5:
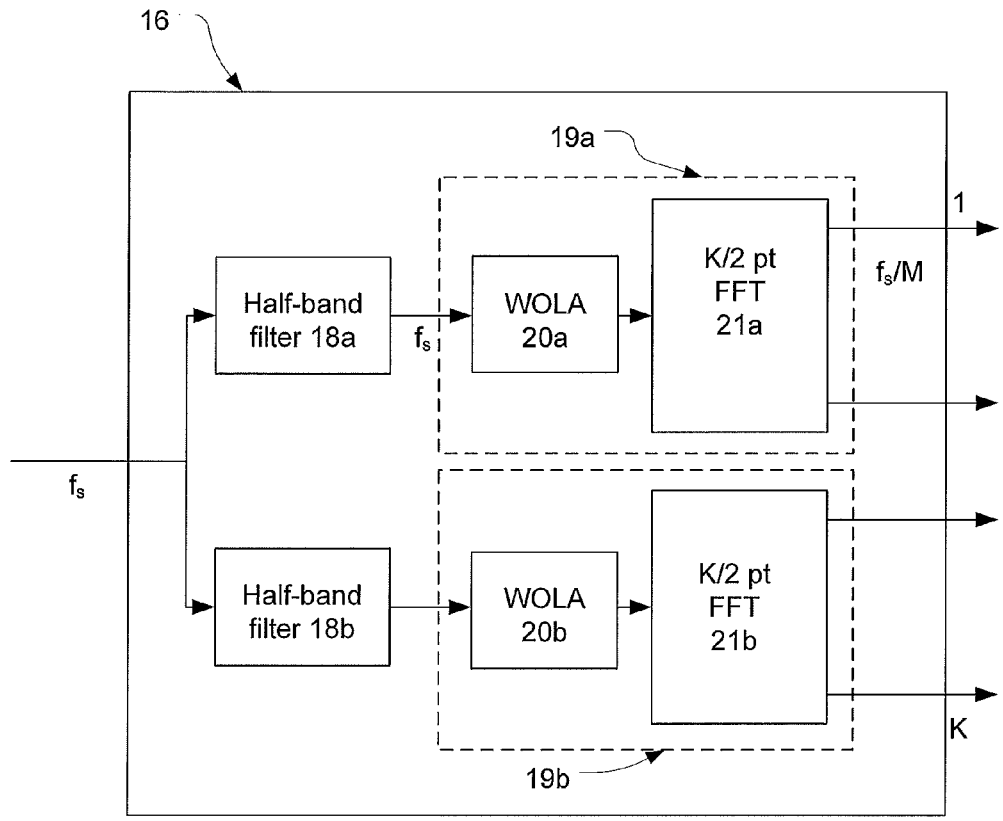
FIG. 5 is a functional diagram of a block channeliser of the processor unit of FIG. 3.

The complex signal is provided from the DAAF 11 of the signal processor to the block processor 16 where it is demultiplexed into a number of sub-bands corresponding to different frequency bands and where the sampling frequency for each sub-band is reduced. The spectrum full bandwidth signals, which in the case of a range line is the chirp bandwidth $B_{chirp}$, is schematically shown in FIG. 4 and can comprise a frequency multiplex of K equally spaced sub-band channels in an even stacking arrangement, centred at $\omega = 2\pi k/K$ where $k = 0, \ldots K-1$ and where K is assumed even. In other words, for a range line, the signal is demultiplexed into a plurality of frequency sub-bands of the full chirp bandwidth. K may, for example, be equal to 100. However, it should be understood that K may have any suitable value. The block channeliser 16, which will be described in more detail with respect to FIG. 5, is a computationally efficient, FFT-based filter processor which divides the input into its K constituent sub-band channels. The sampling rate of each sub-band is reduced by a factor of M in the block channeliser, where M is smaller or equal to the number of channels. It should be noted that when M=K, maximum decimation is provided and the sub-bands are critically sampled.

Each sub-band channel is then provided with a sampling rate of fs/M to a separate compression filter 17a-17k which carries out a direct convolution of each sub-band. In other words, the compression of the signal is carried out on each sub-band separately.

It will be appreciated that the full bandwidth signal corresponding to a range line comprises information about a plurality of target points and each frequency sub-band will comprise information about each of the plurality of target points. In other words, each frequency sub-band will comprise information about the same target points but with a lower resolution than the full bandwidth signal.

By carrying out range or azimuth compression on a number of sub-bands instead of on the whole bandwidth, the processing rate of the filters 17a-17k can be reduced. Denoting the length of the full bandwidth compression filter by N, the computation rate in a direct convolution of the input with this filter is $Nf_s$ complex multiplications per second.

$$\text{Computation rate}_{no\ channelisation} = Nf_s \quad \text{Equation 2}$$

In some embodiments, the compression filters 17a-17k are identical impulse response filters, each operating on their respective sub-channel. The filter impulse response of each filter is the complex conjugate of the transmitted chirp waveform and the length of the filter N is the number of chirp waveform samples in the chirp period $T_{chirp}$. Consequently, when the transmitted chirp waveform is sampled at the full rate $f_s$, we have:

$$N = T_{chirp}/(1/f_s). \quad \text{Equation 3}$$

The full bandwidth compression filter for range processing spans a bandwidth $B_{chirp}$ which can be expressed as $B_{chirp} \approx K_{chirp} T_{chirp}$, as mentioned with respect to Equation 1 above.

The critically sampled sub-band has bandwidth $B_{chirp}/K$. Consequently, the time it takes it takes for the chirp at rate $K_{chirp}$ to sweep across the sub-band $T_{sub-band,\ chirp}$ is $T_{chirp}/K$ seconds. Moreover, since the sub-band has a lower bandwidth, the sampling rate can be reduced to $f_s/M$, as shown in FIG. 3, where M≤K. Consequently, the sampling time step in the sub-band channels is $M/f_s$ seconds. As should be realised by the skilled person, when M=K, the sampling rate is matched to the bandwidth and the sub-band is critically sampled. Conversely, if M<K, for example K/2, the sub-band is oversampled.

Denoting the length of the sub-band filter compression filter as $N_{sub}$, it follows that the length of the sub-band filter equals the time it takes for the chirp to sweep across the sub-band divided by the sampling time step:

$$N_{sub} = T_{sub-band,chirp} \frac{f_s}{M} = \frac{T_{chirp}}{K} \frac{f_s}{M} \quad \text{Equation 4}$$

Using Equation 3, this becomes $$N_{sub} = \frac{N}{KM} \quad \text{Equation 5}$$

When the sub-band is critically sampled, M=K and so $N_{sub}=N/K^2$. When the sub-band is oversampled, e.g. by a factor of 2 with M=K/2, then the filter is longer, e.g. $N_{sub}=2N/K^2$.

The computational rate in the bank of sub-band compression filters is the number of filters K, multiplied by the rate of each sub-band $f_s/M$ and the length of each filter $N_{sub}$, $$\text{computation rate}_{channelised}=K(f_s/M)N_{sub}=K(f_s/M)N/(MK)=Nf_s/M^2 \quad \text{Equation 6}$$

For the critically sampled case, the computational rate can be expressed as, $$\text{computation rate}_{channelised}=Nf_s/K^2 \quad \text{Equation 7}$$

Consequently, it can be seen that the convolution computational load in the compression filters acting on the sub-bands is a factor of $1/K^2$ of that in the direct convolution of the whole bandwidth signal when M=K.

When all range lines have been processed, a full intermediate matrix for each channel has been generated in memory 3. Once the matrices have been adjusted in the range migration unit 13, each azimuth line of an intermediate matrix is fed to the azimuth processor 14 to be individually processed. The intermediate matrices generated by the range compressor may be processed sequentially. As mentioned above, the azimuth processor 14 can also be implemented as shown in FIG. 3. Each azimuth line of each intermediate matrix can be channelised into K' channels and the azimuth compression to be carried out on each of the K' channels individually creating K' new matrices for each intermediate matrix. In the azimuth processing unit, the block channeliser 16 will typically divide the data into a different number of channels and the compression filter has different coefficients corresponding to a different impulse response. Moreover, in the azimuth processing unit, the frequency bandwidth is the Doppler bandwidth and not the bandwidth of each pulse. As the SAR antenna moves over a target point, the distance to the target point changes which causes a phase variation in the received signal as a function of azimuth. The variation in phase between adjacent samples in an azimuth line depends on the pulse repetition rate and how quickly the antenna moves over the target. The bandwidth in azimuth, which results from the phase variation, is known as the Doppler bandwidth. Accordingly, for an azimuth line, the signal is demultiplexed into a plurality of frequency sub-bands of the Doppler bandwidth of the received echoes. It will be appreciated that the full bandwidth signal corresponding to an azimuth line comprises information about a plurality of target points and each frequency sub-band to which the signal is demultiplexed will comprise information about each of the plurality of target points. In other words, each frequency sub-band will comprise information about the same target points but with a lower resolution than the full bandwidth signal.

The full azimuth bandwidth compression filter would also have the form of a chirp waveform, just like in range, but with a different centre frequency and chirp rate. Consequently, the computational savings in performing azimuth compression on frequency channels as opposed to direct convolution on the full bandwidth signal is also proportional to $1/K'^2$, where K' is the number of channels into which the azimuth bandwidth is divided. However, it should be realised that typically the azimuth bandwidth is much smaller than the range bandwidth and the number of channels used during azimuth processing is typically much smaller than the number of channels used during range processing.

When the range compression and the azimuth compression have been completed, the initial raw data matrix has been transformed into a number of sub-images in the memory 3. All the sub-images are of the same target area. In the embodiments where both the range processor unit and the azimuth processor unit divides the data into frequency channels, the number of sub-images is KK' where K is the number of channels used during the range processing and K' is the number of channels used during the azimuth processing.

It should be realised that the sub-images are fully formed SAR images in their own right, just at a lower resolution than the image that would have been obtained had the raw data been processed at its full bandwidth.

With reference to FIG. 2 again, the image generator 15 forms a SAR image based on the sub-images. In some embodiments, the image generator 15 is configured to combine the sub-images into a full bandwidth output signal. However, in other embodiments, the image generator 15 is configured to combine the sub-images by averaging in order to produce a low-resolution image with an improved signal to noise ratio compared to the sub-images. The images can be averaged by simply stacking the images on top of each other and adding corresponding pixels. If KK'=100, the amount of data that is required to be stored can be reduced by a factor of 100 by averaging the sub-images instead of adding the images together to obtain a full resolution image. In some embodiments, a subset of the images is added together and different subsets are then averaged to provide a better resolution image. A significantly smaller volume of storage would be required to store the averaged Level 1 product compared to the volume of storage required to store the Level 0 data from which the averaged Level 1 product is obtained.

In some embodiments, the image generator can further be configured to generate interferograms as part of the Level 1 product. If the spacecraft has two or more SAR antennas, the sub-images from the different antennas can be correlated in the image generator 15 to produce a number of sub-interferograms. An interferogram with an improved signal to noise ratio can then be achieved by averaging the sub-interferograms.

Moreover, in some embodiments, the image generator may apply standard image compression techniques to the averaged Level 1 product to further reduce the data volume. As an example, jpeg compression techniques can be used to further compress the data. However, it should be realised that any suitable image compression technique can be used. The averaged SAR images or averaged interferograms can be further reduced using standard image compression techniques prior to storage and/or downlink transmission.

A suitable architecture for the block processor 16 of FIG. 3 is shown with respect to FIG. 5. In brief, the block processor 16 comprises block fine processing stages 18a, 18b and block coarse processing stages 19a, 19b. The block processor and block processing stages are a "block" processor and "block" processing stages in the sense that they apply a single computational function simultaneously to all the frequency channels in the input signal. The fine processing stage 18a, 18b and the block coarse processing stage 19a, 19b together demultiplex the signal corresponding to a range line or an azimuth line into a plurality of frequency channels. In the embodiment shown in FIG. 5, the block fine processing stages are provided by two imaged half-band filters 18a, 18b configured to generate from the signal corresponding to a range line or an azimuth line a frequency division multiplex (FDM) signal with a number of even index frequency channels and an FDM signal with a number of odd index frequency channels respectively. The region of the spectrum corresponding to the odd index channels has been nulled in the signal with the even index channels and the region of the spectrum corresponding to the even index channels has been nulled in signal with the odd index channels. The half-band filters of the block channeliser may comprise one high pass filter and one low pass filter. The impulse response of the half-band filters are padded with N−1 zeros to produce N even numbered and N odd numbered images of the basic, tight prototype frequency response of which the images are copies.

The block coarse processing stages 19a, 19b then isolate the even numbered and the odd numbered channels from the FDM signals output by the fine processing stages. In more detail, each block processing stage comprises a Weighted OverLap Add (WOLA) unit 20a, 20b and a linked K/2 point FFT unit 21a, 21b. Each FDM signal from the fine processing stages is provided to a separate WOLA units 20a, 20b and its linked K/2 point FFT units 20a, 20b. Each WOLA unit and associated K/2-point FFT unit generate a plurality of narrow band channels from their respective FDM signal. Each WOLA performs a filtering function with a response having transition bands in the nulled out regions of the spectrum of the associated FDM signal. In some embodiments, each WOLA unit and linked K/2-point FFT unit may be replaced with a polyphase-Discrete Fourier Transform (DFT) channeliser. Decimation by a factor of M is carried out within the block channeliser 16. Conceptually, the block channelisation occurs at the full sampling rate of the input and each sub-band output is oversampled by the factor M. The sub-band channel outputs can then be decimated by a factor of M without causing aliasing. In practice, the decimation factor is absorbed into the block channeliser structure so that the unwanted samples in the outputs are simply not computed, achieving computational savings.

The block signal generator can be incorporated in an application specific integrated circuit (ASIC) or a field programmable gate array (FPGA). A more detailed description of a suitable architecture for the block processor, together with modifications and variations, can be found in EP0695054 and EP0831611. However, it should be realised that any suitable architecture for the block channeliser can be used.

Figure 6:
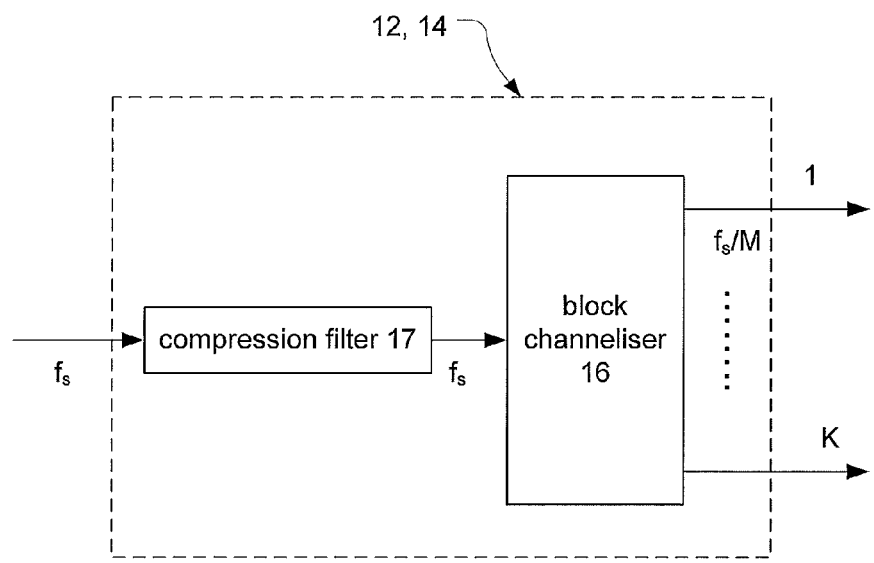
FIG. 6 shows an alternative embodiment of a processor unit of FIG. 2.

Another embodiment of the range processor unit 12 or the azimuth processor unit 14 is shown in FIG. 6. In FIGS. 3 and 6, like reference numerals designate like components. However, in FIG. 6, instead of providing separate compression filters for the channels, a compression filter 17 with an imaged frequency response is provided to operate on the signal before being provided to the block processor 16. The compression filter 17 is derived from the prototype filters 17a-17k of FIG. 3. The compression filter response is interpolated by padding K−1 zero samples between each input sample to form the frequency response H'($e^{j\omega}$)=H ($e^{j\omega K}$), where H($e^{j\omega}$) is the frequency response of the prototype filter h(n) and $$h'(n) = \begin{cases} h(n/K), & n = 0, \pm K, \pm 2K \ldots \\ 0, & \text{otherwise} \end{cases}$$

The imaged filter therefore does not act on the whole bandwidth but performs low resolution compression on the individual channels as a block process acting on the complete wideband signal. The subsequent block channeliser 16 then frequency demultiplexes the sub-bands in already compressed form. In other words, the compression can be considered to be carried out on "conceptual" frequency channels before the frequency channels are isolated. The imaged compression filter still has $N_{sub}$ non-zero coefficients for each sub-channel, with $N_{sub}$ calculated for the critically sampled case, so the computational workload for the arrangement of FIG. 6 is $f_s N_{sub} = f_s N/K^2$, which is the same as the arrangement of FIG. 3 for the critically sampled case, as shown in Equation 7.

The digital processor of FIG. 6 provides a reduced computational load when the sub-bands are oversampled (e.g. by 2) to aid subsequent SAR processing. For example, if a number of different SAR antennas were used, oversampling may be required to co-register and interpolate corresponding sub-images prior to forming an interferogram or a complex coherence map. In this case the workload in the bank of compression filters of the first embodiment is greater than the workload in the single compression filter of the second embodiment, as $1/K^2$ versus $1/M^2$. For example if M=K/2, the block compression in the second embodiment is 4 times more efficient ($1/K^2$ versus $4/K^2$).

Figure 7:
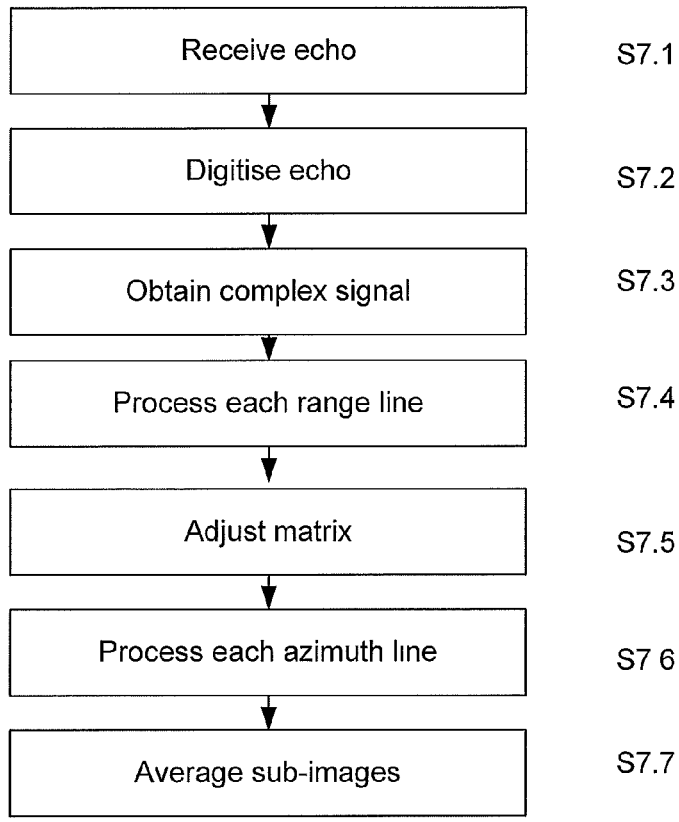
FIG. 7 illustrates a method for receiving and processing SAR data.

With reference to FIG. 7, a method of receiving and processing SAR signals is provided. The echoes from different chirps are received in the antenna 6 at step S7.1. The echoes are then sampled at step S7.2. Immediately after the signals are digitised they are passed to the DAAF filter and processed into complex form at step S7.3. As the range lines come in and are converted into complex form, they are passed to the range processor unit 12 and range compressed at step S7.4. As the range lines are processed at step S7.4, the rows in the intermediate matrices are filled to form a number of full intermediate matrices. It should be realised that individual steps of S7.1, S7.2, S7.3 and S7.4 may not be finished before the next step is begun. The range processor may be processing one range line as the echoes for another range line for the same image are received.

At step S7.5, the data in the matrix is adjusted and moved into the right columns for the azimuth processing and the azimuth lines of the intermediate matrices are then azimuth compressed at step S7.6 to form a number of sub-image matrices. At step S7.7, the sub-images may be averaged to form a final compressed low-resolution image. The compressed image can further processed and/or stored until a suitable time when it can be sent to a ground station.

Figure 8:
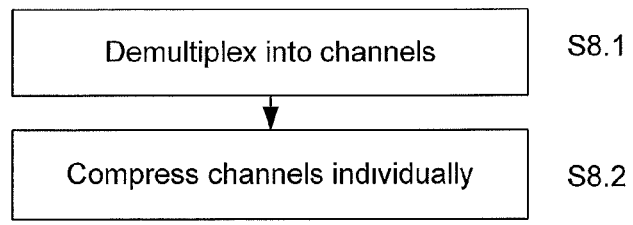
FIG. 8 illustrates a method of processing a signal corresponding to a range or azimuth line in a processor unit of FIG. 3.
Figure 9:
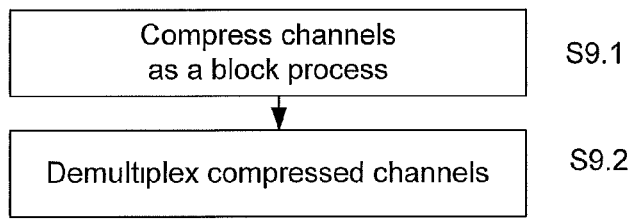
FIG. 9 illustrates a method of processing a signal corresponding to a range or azimuth line in a processor unit of FIG. 6.

Steps S7.4 or S7.6 are described in more detail with respect to FIGS. 8 and 9. It should be realised that in some embodiments, the type of processing unit shown in FIG. 3 or 6, which divides the signal into a number of channels, is used for only the range compression or only the azimuth compression and one of the range compression and the azimuth compression is carried out on the full bandwidth or using other alternative techniques. For example, alternative techniques would be appropriate for the azimuth compression in unfocussed SAR. However, in other embodiments, the signal corresponding to an array of data is divided into frequency channels during both the range compression and the azimuth compression. With respect to FIGS. 8 and 9, the data signal, corresponding to either a range line or an azimuth line, is either demultiplexed into channels at step S8.1 for the compression to be carried out by a number of compression filters on individual channels S8.2 in an processing arrangement shown in FIG. 3 or channels of the signal are compressed at step S9.1 before the compressed channels are demultiplexed at step S9.2 in a processing arrangement as shown in FIG. 6.

Whilst specific examples of the invention have been described, the scope of the invention is defined by the appended claims and not limited to the examples. The invention could therefore be implemented in other ways, as would be appreciated by those skilled in the art.

For example, as described above, only one of the range compression and the azimuth compression may be implemented as described with respect to FIG. 3 and FIG. 6. It is contemplated that the processing technique and the processing unit described with respect to FIGS. 3 and 6 may only be used for the range line and the compression in azimuth is obtained by averaging the samples in each azimuth line or by an alternative technique appropriate for an unfocussed SAR system. In some embodiments, the range compression is implemented as described with respect to FIG. 3 or FIG. 6 in hardware and the azimuth compression is implemented in software. Since the bandwidths involved in azimuth processing is generally so much lower, the processing rates are sufficiently slow for the software on a space CPU to be able to carry out the azimuth processing in some cases. Consequently, in applications where the azimuth processing is simplified, the azimuth processing may be carried out in software.

It should be realised that although the components of the signal processor 10 have been described as implemented in hardware or software, some of the functions provided by the components can be implemented in a combination of hardware and software.

Moreover, it should be realised that the invention is not restricted to satellites and other space platforms. The invention could be used in any suitable application, especially in applications where processor mass, power and particularly TM bandwidth are at a premium. For example, the invention could be used in an unmanned aerial vehicle (UAV) or other aerial platform. For UAV, the real-time imagery aspect of the invention would be particularly relevant.

Additionally, it should be realised that although it has been described with respect to FIG. 2 that the range lines are provided directly from the pre-processor 11 to the range processor unit 12, the range processor unit 12 does not have to act in real-time on the samples from the ADC 9. Instead, the ADC output could be stored in the memory for processing at a later time. Such an approach would be useful in missions with a relatively short data acquisition and storage phase, followed at leisure by a processing stage to reduce the data volume before downlink transmission. An example of such a mission would be a planetary flyby mission.

Also, it should be realised that although specific examples of the block channeliser and the compression filters have been described, any suitable architectures can be used for frequency demultiplexing the signals into channels and carrying out image formation on the channels individually. Moreover, the number and order of compression filters and channelisers can be varied depending on the application. It is contemplated that although a single imaged response filter has been described with reference to FIG. 6, a number of imaged response filters may be provided to carry out image formation on the channels separately before the channels are isolated.

The invention claimed is:

1. Apparatus for a spaceborne or aerial platform, comprising:
    analogue to digital converter means for converting received SAR echoes into digital samples;
    a frequency demultiplexer for frequency demultiplexing a signal corresponding to a range line or an azimuth line of Synthetic Aperture Radar (SAR) data, and containing information about a plurality of target points, into a plurality of frequency channels, each frequency channel signal containing information about each of the plurality of target points;
    compression means for performing compression on the information contained in each frequency channel;
    a processor having range processing means for carrying out range compression of arrays of samples corresponding to range lines and azimuth processing means for carrying out azimuth compression on arrays of samples corresponding to azimuth lines, wherein at least one output of the range compression means and the azimuth compression means includes the apparatus, the processor being configured to generate a plurality of sub-images corresponding to the compressed information in the frequency channels into which a signal corresponding to a range line or an azimuth line is demultiplexed;
    image generator means for combining the sub-images; and
    a transmitter configured to send the combined sub-images to a ground station.

2. Apparatus according to claim 1, wherein the frequency demultiplexer and the compression means are implemented in hardware.

3. Apparatus according to claim 2, wherein the compression means comprises:
    one or more compression filters.

4. Apparatus according to claim 2, wherein the compression means comprises:
    a compression filter for providing an output signal to the frequency demultiplexer, the compression filter providing a filtering function with an imaged response for each frequency channel.

5. Apparatus according to claim 4, wherein a frequency response of the compression filter is configured for providing the imaged response as $H'(e^{j\omega}) = H(e^{j\omega K})$, where $H(e^{j\omega})$ is a frequency response of a prototype filter h(n) and:

$$h'(n) = \begin{cases} h(n/K), & n = 0, \pm K, \pm 2K \ldots \\ 0, & \text{otherwise} \end{cases}$$

and where K is the number of frequency channels.

6. Apparatus according to claim 5, wherein the frequency demultiplexer comprises:
    block fine processing stages and block coarse processing stages, the block fine processing stages being configured to generate from the signal corresponding to a range line or an azimuth line one or more first frequency division multiplex FDM signals with a number of even index channels and one or more second FDM signals with a number of odd index channels, a region of a spectrum corresponding to the odd index channels having been nulled out in the one or more first FDM signals and a region of the spectrum corresponding to the even index channels having been nulled out in the one or more second FDM signals, the one or more first FDM signals and second FDM signals being provided to separate coarse processing stages and each coarse processing stage generating a plurality of narrow band channels from its respective FDM signal, each block coarse processing stage being configured for performing a filtering function with response transition bands which lie in the nulled out regions of the spectrum of the associated FDM signal.

7. An arrangement for creating SAR images on a spaceborne or aerial platform in combination with the apparatus of claim 1,
wherein both the range processing means and the azimuth processing means include the apparatus, wherein the frequency demultiplexer in the range processing means is configured to demultiplex a signal corresponding to a range line into $K_{range}$ frequency channels and the frequency demultiplexer of the azimuth processing means is configured to demultiplex a signal corresponding to an azimuth line into $K_{azimuth}$ frequency channels to produce $K_{range} K_{azimuth}$ frequency channels,
wherein the sub-images are $K_{range} K_{azimuth}$ sub-images that correspond to the $K_{range} K_{azimuth}$ frequency channels.

8. An arrangement according to claim 7, wherein the image generator means is configured to average the sub-images to provide a SAR image.

9. An apparatus according to claim 1, wherein the image generator means is configured to average the sub-images to provide a SAR image.

10. An apparatus according to claim 1, comprising:
a receiver configured to receive echoes from two or more SAR antennas, the image generator means being configured to generate an interferogram from the sub-images.

11. The apparatus of claim 1 in combination with a satellite.

12. Apparatus according to claim 1 wherein the compression means comprises:
one or more compression filters.

13. Apparatus according to claim 1, wherein the frequency demultiplexer comprises:
block fine processing stages and block coarse processing stages, the block fine processing stages being configured to generate from the signal corresponding to a range line or an azimuth line one or more first frequency division multiplex FDM signals with a number of even index channels and one or more second FDM signals with a number of odd index channels, a region of a spectrum corresponding to the odd index channels having been nulled out in the one or more first FDM signals and a region of the spectrum corresponding to the even index channels having been nulled out in the one or more second FDM signals, the one or more first FDM signals and second FDM signals being provided to separate coarse processing stages and each coarse processing stage generating a plurality of narrow band channels from its respective FDM signal, each block coarse processing stage being configured for performing a filtering function with response transition bands which lie in the nulled out regions of the spectrum of the associated FDM signal.

14. A method of generating a SAR image on a spaceborne or aerial platform, comprising
receiving echoes of a chirp transmitted from a SAR antenna;
digitising the echoes into digital samples;
carrying out range compression on arrays of samples corresponding to range lines;
carrying out azimuth compression on arrays of samples corresponding to azimuth lines, wherein at least one out of carrying out range compression and carrying out azimuth compression includes frequency demultiplexing signals corresponding to the arrays into a plurality of channels, each signal corresponding to an array containing information about a plurality of target points and each frequency channel containing information about each of said plurality of target points;
carrying out image formation on each channel such that the range compression and the azimuth compression generates a plurality of sub-images corresponding to a plurality of frequency channels; and
combining said sub-images.

15. A method according to claim 14, wherein the image formation of each channel is carried out before the frequency demultiplexing of the signals and the frequency demultiplexing comprises:
frequency demultiplexing the frequency channels in compressed form.

16. A method according to claim 15, wherein the range compression comprises:
frequency demultiplexing the range lines into a plurality of channels and range compressing the channels individually using a compression filter to form a plurality of intermediate matrices, and wherein the azimuth compression includes frequency demultiplexing each azimuth line of each intermediate matrix into a plurality of frequency channels and azimuth compressing each frequency channel individually using a compression filter to form the plurality of sub-images.

17. A method according to claim 15, wherein the range compression comprises:
frequency demultiplexing the range lines into a plurality of channels and range compressing the channels individually using a compression filter to form a plurality of intermediate matrices, and wherein the azimuth compression includes averaging the samples of each azimuth line to form the plurality of sub-images.

18. A method according to claim 14, wherein combining said images comprises:
averaging the sub-images to produce a compressed image, or wherein receiving echoes from an antenna comprises receiving echoes from a first antenna and combining the sub-images includes correlating corresponding sub-images from the first and a second antenna to form a number of sub-interferograms and averaging the sub-interferograms to generate a compressed interferogram.

19. A method according to claim 14, wherein the range compression comprises:
frequency demultiplexing the range lines into a plurality of channels and range compressing the channels individually using a compression filter to form a plurality of intermediate matrices, and wherein the azimuth compression includes frequency demultiplexing each azimuth line of each intermediate matrix into a plurality of frequency channels and azimuth compressing each frequency channel individually using a compression filter to form the plurality of sub-images.

* * * * *